(12) United States Patent
Sakamoto et al.

(10) Patent No.: US 11,753,173 B2
(45) Date of Patent: Sep. 12, 2023

(54) PARACHUTE DEVICE, FLIGHT DEVICE, AND FLYING BODY EJECTION MECHANISM

(71) Applicant: MINEBEA MITSUMI Inc., Nagano (JP)

(72) Inventors: Yuzuru Sakamoto, Fujisawa (JP); Shoji Shimohisa, Fujisawa (JP); Yoshihiro Mochida, Minamisouma (JP)

(73) Assignee: MINEBEA MITSUMI Inc., Nagano (JP)

( * ) Notice: Subject to any disclaimer, the term of this patent is extended or adjusted under 35 U.S.C. 154(b) by 126 days.

(21) Appl. No.: 17/429,056

(22) PCT Filed: Dec. 25, 2019

(86) PCT No.: PCT/JP2019/050809
§ 371 (c)(1),
(2) Date: Aug. 6, 2021

(87) PCT Pub. No.: WO2020/170603
PCT Pub. Date: Aug. 27, 2020

(65) Prior Publication Data
US 2022/0127006 A1    Apr. 28, 2022

(30) Foreign Application Priority Data

Feb. 19, 2019    (JP) ................. 2019-027795

(51) Int. Cl.
*B64D 17/80*    (2006.01)
*B64C 39/02*    (2023.01)
(Continued)

(52) U.S. Cl.
CPC ............ *B64D 17/80* (2013.01); *B64C 39/024* (2013.01); *B64D 17/72* (2013.01); *B64U 10/13* (2023.01);
(Continued)

(58) Field of Classification Search
CPC ...... B64D 17/72; B64D 17/725; B64D 17/80; B64U 70/83
See application file for complete search history.

(56) References Cited

U.S. PATENT DOCUMENTS 2,924,409 A      2/1960  Burke, Jr.
2016/0251083 A1* 9/2016  Tsaliah .................. B64C 39/024
                                                              244/149
(Continued)

FOREIGN PATENT DOCUMENTS

JP    S63-220100 A    9/1998
JP    4785084 B2     10/2011
(Continued)

OTHER PUBLICATIONS

International Search Report for corresponding International Application No. PCT/JP2019/050809 dated Mar. 10, 2020.
(Continued)

*Primary Examiner* — Richard G Davis
(74) *Attorney, Agent, or Firm* — Pearne & Gordon LLP

(57) ABSTRACT

To provide a parachute device capable of quickly and reliably opening a parachute even when an airflow effect during flying or falling of a flight device cannot be immediately obtained. A parachute device (4) includes a parachute (400), a parachute accommodation section (40) configured to accommodate the parachute, at least one flying body (43) connected to the parachute, and an ejection section (41) configured to hold the flying body and to eject the flying body held, and the flying body includes a flying body main body section (44) engaged with the ejection section, and a gas generating device (45) disposed in an internal space (440) defined by the ejection section and the flying body main body section, and configured to generate gas.

8 Claims, 9 Drawing Sheets

(51) Int. Cl.
    *B64D 17/72*     (2006.01)
    *B64U 10/13*     (2023.01)
    *B64U 30/20*     (2023.01)
    *B64U 70/83*     (2023.01)

(52) U.S. Cl.
    CPC .............. *B64U 30/20* (2023.01); *B64U 70/83* (2023.01); *B64U 2201/00* (2023.01)

(56) References Cited

U.S. PATENT DOCUMENTS

| | | | | |
|---|---|---|---|---|
| 2019/0016468 A1* | 1/2019 | Robertson | .............. | B64D 17/80 |
| 2020/0115049 A1* | 4/2020 | Nakamura | ........... | B64D 17/025 |
| 2021/0387718 A1* | 12/2021 | Nakamura | ............. | B64D 17/62 |

FOREIGN PATENT DOCUMENTS

| | | | |
|---|---|---|---|
| JP | 2018-095051 A | 6/2018 | |
| JP | 2018-168927 A | 11/2018 | |
| JP | 2018-193055 A | 12/2018 | |
| JP | 2019-014320 A | 1/2019 | |
| WO | 2018/190319 A1 | 10/2018 | |

OTHER PUBLICATIONS

Written Opinion for corresponding International Application No. PCT/JP2019/050809 dated Mar. 10, 2020 and English translation.
Notice of Reasons for Refusal dated Apr. 4, 2022 in the corresponding Japanese Application No. 2019-027795 and English translation.
Extended European Search Report dated Sep. 19, 2022 for corresponding European Application No. 19915908.8.

* cited by examiner

PARACHUTE DEVICE, FLIGHT DEVICE, AND FLYING BODY EJECTION MECHANISM

TECHNICAL FIELD

The present invention relates to a parachute device, a flight device, and a flying body ejection mechanism, and relates to, for example, a parachute device attached to a flight device being of the multi-rotor rotary wing aircraft type capable of remote control and autonomous flight.

BACKGROUND ART

In recent years, practical use of flight devices being of the multi-rotor rotary wing aircraft type capable of remote control and autonomous flight (hereinafter, also simply referred to as "rotary wing aircraft") in industrial fields has been considered. For example, in the transportation industry, transport of loads, transport of passengers, and the like by using a rotary wing aircraft (so-called drone) have been considered.

A rotary wing aircraft for transport has an autonomous flight function of flying while identifying an own position by global positioning system (GPS) signals or the like. However, when an abnormality occurs in the rotary wing aircraft due to some cause, there is a risk that autonomous flight may not be possible and an accident such as falling of the rotary wing aircraft may occur. Thus, improvement in safety of the rotary wing aircraft is desired.

In particular, it is expected that the body size of rotary wing aircraft for transport will increase so as to be able to transport larger loads and passengers. When such a large rotary wing aircraft is in an uncontrollable state and falls due to some cause, there is a risk of severe damage to people or structures compared to known rotary wing aircraft. Due to this, when the size of the rotary wing aircraft is increased, safety needs to be emphasized more than ever.

Thus, the inventors of the present application have investigated attaching a parachute used for a flying body as disclosed in, for example, the following Patent Literature, to a rotary wing aircraft in order to improve the safety of the rotary wing aircraft.

CITATION LIST

Patent Literature

Patent Document 1: JP 4785084 B

SUMMARY OF INVENTION

Technical Problem

However, since the known parachute used for a flying body is designed to be easily opened by the airflow generated during flight, it has become apparent via investigation by the inventors that there is a risk that the parachute may not immediately open when the airflow effect cannot be immediately obtained, such as when the parachute falls from a stationary state in the sky.

The present invention has been made in view of the problem described above, and an object of the present invention is to provide a parachute device capable of quickly and reliably opening a parachute even when an airflow effect during flying or falling of a flight device cannot be immediately obtained.

Solution to Problem

A parachute device according to an embodiment of the present invention includes a parachute, a parachute accommodation section configured to accommodate the parachute, at least one flying body connected to the parachute, and an ejection section configured to hold the flying body and to eject the flying body held, and the flying body includes a flying body main body section engaged with the ejection section, and a gas generating device disposed in an internal space defined by the ejection section and the flying body main body section, and configured to generate gas.

Advantageous Effects of Invention

According to one aspect of the present invention, it is possible to quickly and reliably open a parachute even when an airflow effect during flying or falling of a flight device cannot be immediately obtained.

DESCRIPTION OF EMBODIMENTS

1. Overview of Embodiment

Figure 1:
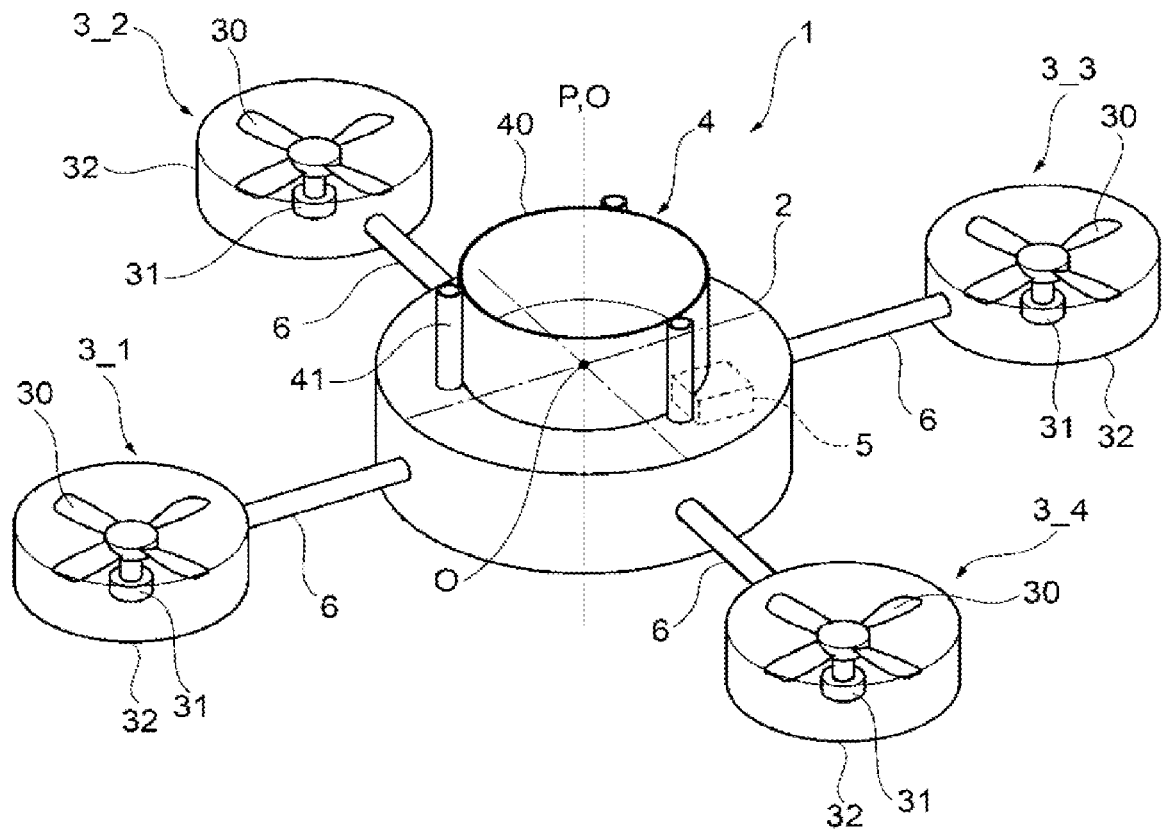
FIG. 1 is a diagram schematically illustrating an appearance of a flight device equipped with a parachute device according to Embodiment 1.

First, an overview of a typical embodiment of the invention disclosed in the present application will be described. Note that, in the following description, reference signs in the drawings corresponding to the constituent elements of the invention are mentioned in parentheses as an example.

[1] A parachute device (4, 4A) according to a typical embodiment of the present invention includes a parachute (400), a parachute accommodation section (40) configured to accommodate the parachute, at least one flying body (43, 43A) connected to the parachute, and an ejection section (41, 41A) configured to hold the flying body and to eject the flying body held, and the flying body includes a flying body main body section (44, 44A) engaged with the ejection section, and a gas generating device (45) disposed in an internal space (440, 440A) defined by the ejection section and the flying body main body section, and configured to generate gas.

[2] In the above-described parachute device (4), the ejection section may be formed in a tube shape having an opening at one end and having a bottom at an other end, the flying body main body section may be formed in a bar shape, the gas generating device may be disposed at one end side of the flying body main body section, and the flying body may be disposed such that the flying body main body section is inserted in an interior of the ejection section at the one end side and the gas generating device faces a bottom portion (412) of the ejection section in the interior of the ejection section.

[3] In the above-described parachute device (4), a connection line (46) connecting the parachute and the flying body may be further provided, and the flying body main body section (44) may include a holding section (441) configured to hold the gas generating device, and a connection section (442) formed so as to protrude to a side opposite to the holding section in an axis (Q) direction of the flying body main body section, and connected to the connection line.

[4] In the above-described parachute device (4), a lead wire (47) configured to ignite the gas generating device may be further provided, and the connection section may be formed in a tube shape, and at least a part of the lead wire may be routed in an interior of the connection section.

[5] In the above-described parachute device (4A), the ejection section (41A) may be formed in a bar shape, the flying body main body section may be formed in a tube shape having an opening at one end and having a bottom at an other end, the gas generating device may be provided in an interior of the flying body main body section, and the flying body (43A) may be supported on the ejection section such that at least a part of the ejection section is inserted in an interior of the flying body main body section (44A) and the gas generating device faces a tip end portion (414A) of the ejection section.

[6] In the above-described parachute device (4A), a connection line (46) connecting the parachute and the flying body (43A) may be further provided, and the flying body main body section (44A) may include a supporting section (443A) formed in a tube shape and inserted with at least a part of the ejection section from one end side, a holding section (441A) configured to hold the gas generating device at an other end side of the supporting section such that the gas generating device faces a tip end portion (414A) of the ejection section inserted from the one end side of the supporting section, and a connection section (442A) formed so as to protrude from the holding section to a side opposite to the supporting section, and connected to the connection line.

[7] In the above-described parachute device (4A), a lead wire (47) configured to ignite the gas generating device may be further provided, the connection section (442A) may be formed in a tube shape, and at least a part of the lead wire may be routed in an interior of the connection section.

[8] In the above-described parachute device (4, 4A), an abnormality detection section (15B) configured to detect an abnormality during flying, and a parachute control section (16B) configured to cause the flying body to be ejected from the ejection section in response to detection of the abnormality by the abnormality detection section may be further provided.

[9] A flight device (1) according to a typical embodiment of the present invention includes an aircraft body unit (2), a thrust force generation section (3) connected to the aircraft body unit and configured to generate a thrust force, a flight control section (14) configured to control the thrust force generation section, an abnormality detection section (15) configured to detect an abnormality during flying, the above-described parachute device (4, 4A), and an ejection control section (42) configured to cause the flying body to be ejected from the ejection section in response to detection of the abnormality by the abnormality detection section.

[10] A flying body ejection mechanism (50, 50A) according to a typical embodiment of the present invention includes a flying body (43, 43A) capable of being connected to a parachute (400), and an ejection section (41, 41A) configured to hold the flying body and to eject the flying body held, and the flying body includes a flying body main body section (44, 44A) engaged with the ejection section, and a gas generating device (45) disposed in an internal space (440, 440A) defined by the ejection section and the flying body main body section, and configured to generate gas.

[11] In the above-described flying body ejection mechanism (50), the ejection section (41) may be formed in a tube shape having an opening at one end and having a bottom at an other end, the flying body main body section may be formed in a bar shape, the gas generating device may be disposed at one end side of the flying body main body section, and the flying body may be disposed such that the flying body main body section is inserted in an interior of the ejection section at the one end side and the gas generating device faces a bottom portion (412) of the ejection section in the interior of the ejection section.

[12] In the above-described flying body ejection mechanism (50A), the ejection section (41A) may be formed in a bar shape, the flying body main body section may be formed in a tube shape having an opening at one end and having a bottom at an other end, the gas generating device may be provided in an interior of the flying body main body section, and the flying body (43A) may be supported on the ejection section such that at least a part of the ejection section is inserted in an interior of the flying body main body section (44A) and the gas generating device faces a tip end portion (414A) of the ejection section.

2. Specific Examples of Embodiment

Hereinafter, specific examples of the embodiments of the present invention will be described with reference to the accompanying drawings. Note that, in the following description, constituent elements common to each of the embodiments are denoted with the same reference signs and will not be described repeatedly. Furthermore, it should be noted that the drawings are schematic drawings and the dimensional relationships, proportions, and the like between elements in the drawings may differ from reality. Among the drawings, portions having mutually different dimensional relationships and proportions may be included.

Embodiment 1

FIG. 1 is a diagram schematically illustrating an appearance of a flight device equipped with a parachute device according to Embodiment 1. A flight device 1 illustrated in FIG. 1 is, for example, a flight device being of the multi-rotor rotary wing aircraft type equipped with three or more rotors, and is a so-called drone.

As illustrated in FIG. 1, the flight device 1 includes an aircraft body unit 2, thrust force generation sections 3_1 to 3_n (n being an integer equal to or greater than 3), a parachute device 4, a notification device 5, and arm sections 6.

The aircraft body unit 2 is a main body portion of the flight device 1. As will be described below, the aircraft body unit 2 accommodates various functional sections for controlling flying of the flight device 1. Note that in FIG. 1, the aircraft body unit 2 having a cylindrical shape is illustrated as an example, but a shape of the aircraft body unit 2 is not particularly limited.

The thrust force generation sections 3_1 to 3_n are rotors configured to generate a thrust force. Note that, in the following description, when each of the thrust force generation sections 3_1 to 3_n is not specifically distinguished, each of the thrust force generation sections is simply referred to as a "thrust force generation section 3". The number of the thrust force generation sections 3 provided in the flight device 1 is not particularly limited, but is preferably three or more. For example, the flight device 1 may be any of a tricopter provided with three thrust force generation sections 3, a quadcopter provided with four thrust force generation sections 3, a hexacopter provided with six thrust force generation sections 3, and an octocopter provided with eight thrust force generation sections 3.

Note that in FIG. 1, a case of the flight device 1 being equipped with four (n=4) thrust force generation sections 3_1 to 3_4 and serving as a quadcopter is illustrated as an example.

The thrust force generation section 3 has, for example, a structure where a propeller 30, and a motor 31 configured to rotate the propeller 30, are accommodated in a case 32 having a tube shape. A net (for example, a resin material, a metal material (stainless steel, or the like), or the like) for preventing contact with the propeller 30 may be provided in an opening portion of the case 32 having the tube shape.

An arm section 6 has a structure for connecting the aircraft body unit 2 and each of the thrust force generation sections 3. The arm section 6 is formed so as to radially protrude from the aircraft body unit 2 with, for example, a central axis O of the aircraft body unit 2 as a center. Each of the thrust force generation sections 3 is attached respectively to a tip end of each of the arm sections 6.

The notification device 5 is a device for notifying the outside of the flight device 1 of danger. The notification device 5 is configured by including a light source formed of, for example, a light emitting diode (LED) or the like, or a sound generation device (an amplifier, a speaker, and the like). In response to detection of abnormalities by the abnormality detection section 15 to be described below, the notification device 5 notifies, by using light or sound, the outside of a dangerous state of the flight device 1.

Note that the notification device 5 may be exposed to the outside of the aircraft body unit 2, or may be accommodated in the interior of the aircraft body unit 2 in a form capable of outputting light generated from a light source, sound generated from a speaker, or the like to the outside.

The parachute device 4 is a device for slowing the falling speed of the flight device 1 and causing the flight device 1 to fall in a safe manner when an abnormality occurs in the flight device 1 and there is a risk of falling.

As illustrated in FIG. 1, for example, the parachute device 4 is installed on the aircraft body unit 2. Note that the specific configuration of the parachute device 4 will be described later.

Figure 2:
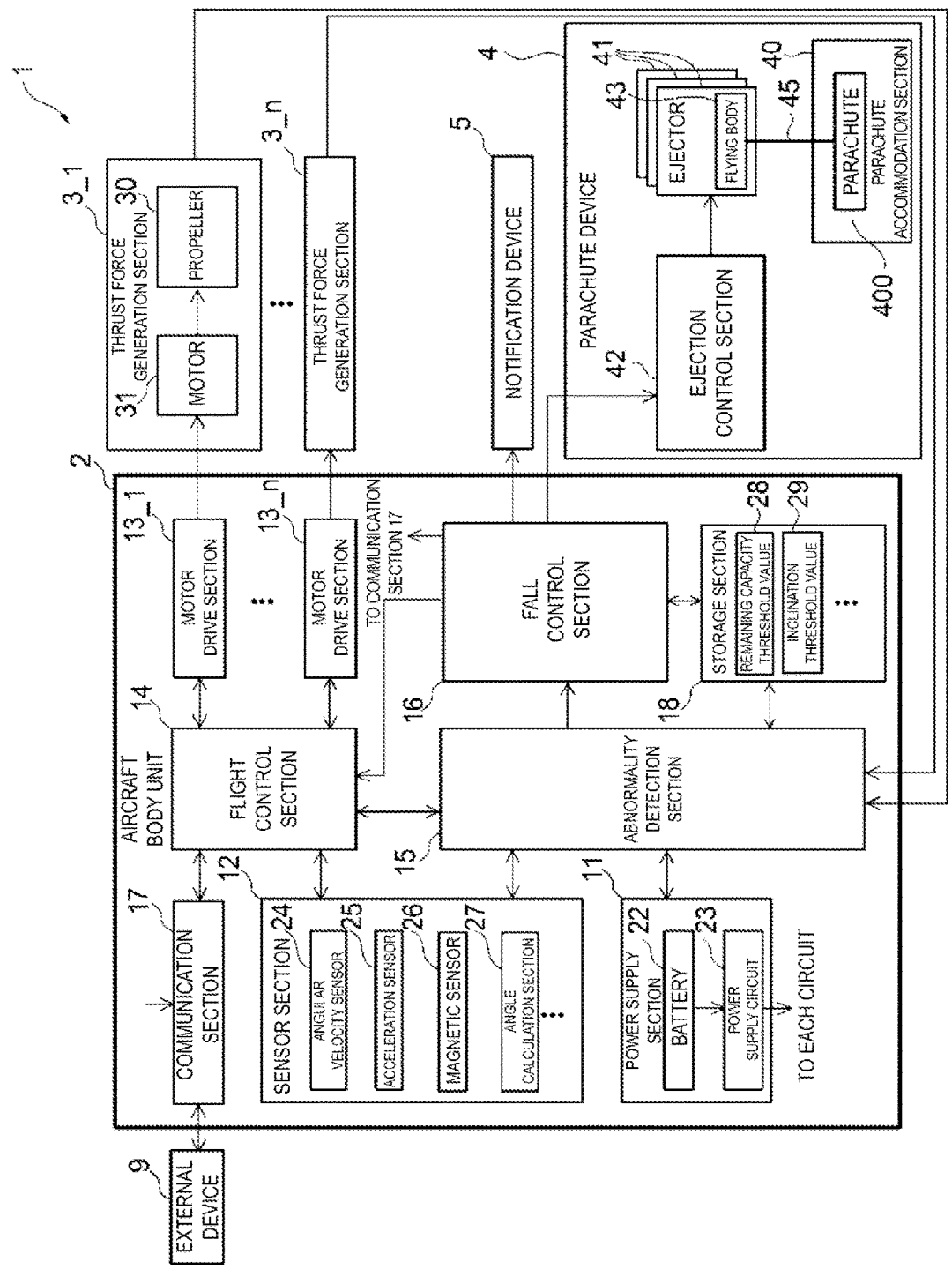
FIG. 2 is a functional block diagram of the flight device equipped with the parachute device according to Embodiment 1.

FIG. 2 is a functional block diagram of the flight device 1 equipped with the parachute device 4 according to Embodiment 1.

As illustrated in FIG. 2, the aircraft body unit 2 includes a power supply section 11, a sensor section 12, motor drive sections 13_1 to 13_n (n being an integer equal to or greater than 3), a flight control section 14, an abnormality detection section 15, a fall control section 16, a communication section 17, and a storage section 18.

Among these functional sections, the flight control section 14, the abnormality detection section 15, and the fall control section 16 are achieved by, for example, cooperation between program processing by a program processing device such as a microcontroller including a central processing unit (CPU) and a storage device such as a memory and peripheral circuits (hardware resources).

The power supply section 11 includes a battery 22 and a power supply circuit 23. The battery 22 is, for example, a secondary battery (for example, a lithium-ion secondary battery). The power supply circuit 23 is a circuit configured to generate a power supply voltage based on an output voltage of the battery 22 to supply the power supply voltage to each hardware implementing the above-described functional sections. The power supply circuit 23 includes, for example, a plurality of regulator circuits, and supplies a power supply voltage having an appropriate magnitude for each hardware described above.

The sensor section 12 is a functional section for detecting a state of the flight device 1. The sensor section 12 detects an inclination of the aircraft body of the flight device 1. Specifically, the sensor section 12 includes an angular velocity sensor 24, an acceleration sensor 25, a magnetic sensor 26, and an angle calculation section 27.

The angular velocity sensor 24 is a sensor for detecting an angular velocity (rotational velocity). For example, the angular velocity sensor 24 is a triaxial gyro sensor configured to detect an angular velocity based on three reference axes of an x-axis, a y-axis, and a z-axis.

The acceleration sensor 25 is a sensor for detecting an acceleration. For example, the acceleration sensor 25 is a triaxial acceleration sensor for detecting an acceleration based on three reference axes of the x-axis, the y-axis, and the z-axis.

The magnetic sensor 26 is a sensor for detecting terrestrial magnetism. For example, the magnetic sensor 26 is a triaxial geomagnetic sensor (electronic compass) for detecting an azimuth (absolute direction) based on three reference axes of the x-axis, the y-axis, and the z-axis.

The angle calculation section 27 calculates an inclination of the aircraft body of the flight device 1 based on a detection result of at least one of the angular velocity sensor 24 and the acceleration sensor 25. Here, the inclination of the aircraft body of the flight device 1 is an angle of the aircraft body (the aircraft body unit 2) with respect to the ground (horizontal direction).

For example, the angle calculation section 27 may calculate an angle of the aircraft body with respect to the ground based on a detection result of the angular velocity sensor 24, or may calculate an angle of the aircraft body with respect to the ground based on detection results of the angular velocity sensor 24 and the acceleration sensor 25. Note that, as a method of calculating an angle by using detection results of the angular velocity sensor 24 and the acceleration sensor 25, a known calculation equation may be used.

Additionally, the angle calculation section 27 may correct, based on a detection result of the magnetic sensor 26, the angle calculated based on the detection result of at least one of the angular velocity sensor 24 and the acceleration sensor 25.

Note that, in addition to the angular velocity sensor 24, the acceleration sensor 25, and the magnetic sensor 26 described above, the sensor section 12 may include, for example, an air pressure sensor, an air volume (wind direction) sensor, an ultrasonic sensor, a GPS receiver, a camera, and the like.

The communication section 17 is a functional section for communicating with an external device 9. Here, the external device 9 is a transmitter, a server, or the like configured to control an operation of the flight device 1 and to monitor a status of the flight device 1. The communication section 17 is configured by, for example, a radio frequency (RF) circuit and the like. Communication between the communication section 17 and the external device 9 is achieved, for example, by wireless communication in an ISM band (2.4 GHz band).

The communication section 17 receives operation information of the flight device 1 transmitted from the external device 9 to output the operation information to the flight control section 14, and transmits various measurement data and the like measured by the sensor section 12 to the external device 9. In addition, when an abnormality of the flight device 1 is detected by the abnormality detection section 15, the communication section 17 transmits, to the external device 9, information indicating that an abnormality has occurred in the flight device 1. Furthermore, the communication section 17 transmits, to the external device 9, information indicating that the flight device 1 has fallen when the flight device 1 falls to the ground.

The motor drive sections 13_1 to 13_n are provided for the respective thrust force generation sections 3, and are functional sections for driving the motors 31 to be driven in accordance with an instruction from the flight control section 14.

Note that, in the following description, when each of the motor drive sections 13_1 to 13_n is not specifically distinguished, each of the motor drive sections 13_1 to 13_n is simply referred to as a "motor drive section 13".

The motor drive section 13 drives the motor 31 such that the motor 31 rotates at the number of rotations instructed from the flight control section 14. For example, the motor drive section 13 is an electronic speed controller (ESC).

The flight control section 14 is a functional section for comprehensively controlling the respective functional sections of the flight device 1.

The flight control section 14 controls the thrust force generation sections 3 so that the flight device 1 stably flies. Specifically, the flight control section 14 calculates the appropriate number of rotations of the motor 31 of each thrust force generation section 3 so that the aircraft body stably flies in a desired direction, based on operation information received by the communication section 17 from the external device 9 (instructions for ascending, descending, advancing, retreating, and the like), and detection results of the sensor section 12, and instructs the calculated number of rotations to each motor drive section 13.

The flight control section 14 calculates the appropriate number of rotations of the motor 31 of each thrust force generation section 3 such that the aircraft body becomes horizontal, based on a detection result of the angular velocity sensor 24 when a posture of the aircraft body is disturbed, for example, due to an external influence such as wind, and instructs the calculated number of rotations to each motor drive section 13.

In addition, for example, the flight control section 14 calculates the appropriate number of rotations of the motor 31 of each thrust force generation section 3 based on a detection result of the acceleration sensor 25 in order to prevent drift of the flight device 1 during hovering of the flight device 1, and instructs the calculated number of rotations to each motor drive section 13.

Additionally, the flight control section 14 controls the communication section 17 to achieve transmission and reception of the various data described above to and from the external device 9.

The storage section 18 is a functional section for storing various programs, parameters, and the like for controlling operations of the flight device 1. For example, the storage section 18 is configured of a non-volatile memory such as a flash memory and a ROM, a RAM, and the like.

The above-described parameters stored in the storage section 18 are, for example, a remaining capacity threshold value 28, an inclination threshold value 29, and the like to be described below.

The abnormality detection section 15 is a functional section for detecting an abnormality during flying. Specifically, the abnormality detection section 15 monitors detection results of the sensor section 12, a state of the battery 22, and operation states of the thrust force generation sections 3, and determines whether the flight device 1 is in an abnormal state or not.

Here, the abnormal state refers to a state where autonomous flight of the flight device 1 may become impossible. For example, a state where at least one of a case where the thrust force generation section 3 has broken down, a case where a remaining capacity of the battery 22 has dropped below a predetermined threshold value, and a case where the aircraft body (the aircraft body unit 2) is abnormally inclined occurs is referred to as the abnormal state.

When the abnormality detection section 15 detects a failure of the thrust force generation section 3, the abnormality detection section 15 determines that the flight device 1 is in the abnormal state. Here, the "failure of the thrust force generation section 3" refers to, for example, a case where the motor 31 does not rotate at the number of rotations specified by the flight control section 14, a case where the propeller 30 does not rotate, a case where the propeller 30 has broken down, and the like.

In addition, when the abnormality detection section 15 detects that the remaining capacity of the battery 22 has dropped below a predetermined threshold value (hereinafter, also referred to as the "remaining capacity threshold value") 28, the abnormality detection section 15 determines that the flight device 1 is in the abnormal state.

Here, the remaining capacity threshold value 28 may be such a capacity value that the motor cannot rotate at the number of rotations instructed by the flight control section 14, for example. The remaining capacity threshold value 28 is stored in advance in the storage section 18, for example.

In addition, when the abnormality detection section 15 detects an abnormal inclination of the flight device 1 (aircraft body), the abnormality detection section 15 determines that the flight device 1 is abnormal. For example, the abnormality detection section 15 determines that the flight device 1 is in the abnormal state when a state where an angle calculated by the angle calculation section 27 exceeds a predetermined threshold value (hereinafter, also referred to as the "inclination threshold value") 29 continues for a predetermined period of time.

An angle (pitch angle) of movement of the flight device 1 in a front and rear direction and an angle (roll angle) of movement of the flight device 1 in a left and right direction are obtained in advance by an experiment, and then, the inclination threshold value 29 may be set to a value larger than these angles. The inclination threshold value 29 is stored in advance in the storage section 18, for example.

A fall control section (one example of a parachute control section) 16 is a functional section for controlling falling of the flight device 1. Specifically, when the abnormality detection section 15 detects that the flight device 1 is in the abnormal state, the fall control section 16 performs fall preparation processing for causing the flight device 1 to fall in a safe manner.

Specifically, the fall control section 16 performs the following processing as the fall preparation processing. In other words, the fall control section 16 controls the notification device 5 in response to the detection of the abnormality by the abnormality detection section 15, and notifies the outside of a dangerous state. In addition, the fall control section 16 controls the respective motor drive sections 13 in response to the detection of the abnormality by the abnormality detection section 15 to stop the rotation of each motor 31. Furthermore, in response to the detection of the abnormality by the abnormality detection section 15, the fall control section 16 outputs a control signal indicating opening of a parachute to the parachute device 4 to open a parachute 400.

Next, the parachute device 4 according to Embodiment 1 will be described in detail.

Figure 3:
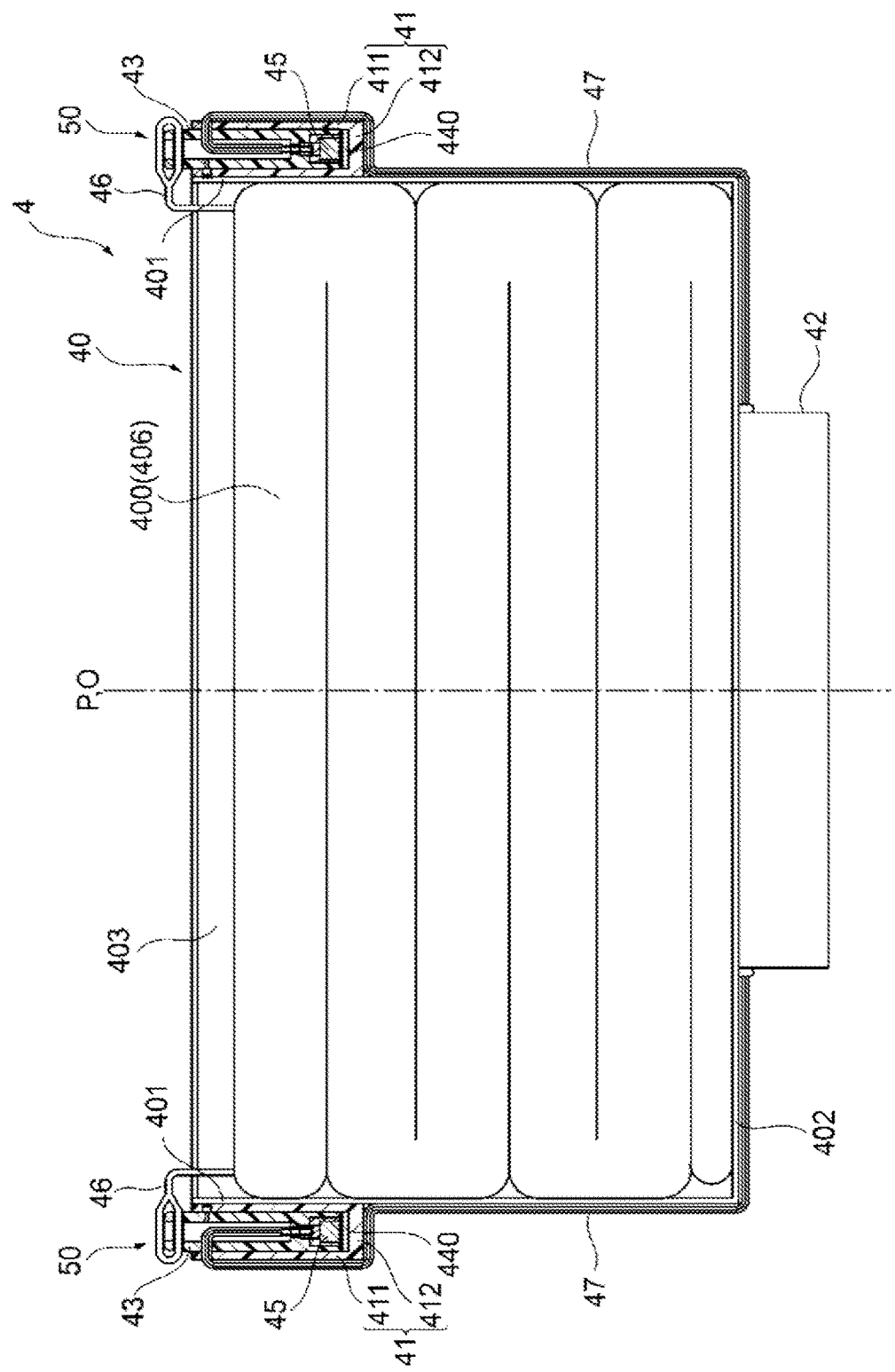
FIG. 3 is a diagram schematically illustrating a configuration of the parachute device according to Embodiment 1.

FIG. 3 is a diagram schematically illustrating a configuration of the parachute device 4 according to Embodiment 1. A side cross section of the parachute device 4 is illustrated in the same figure.

The parachute device 4 includes a parachute 400, a parachute accommodation section 40, ejection sections 41, an ejection control section 42, and flying bodies 43.

Figure 4:
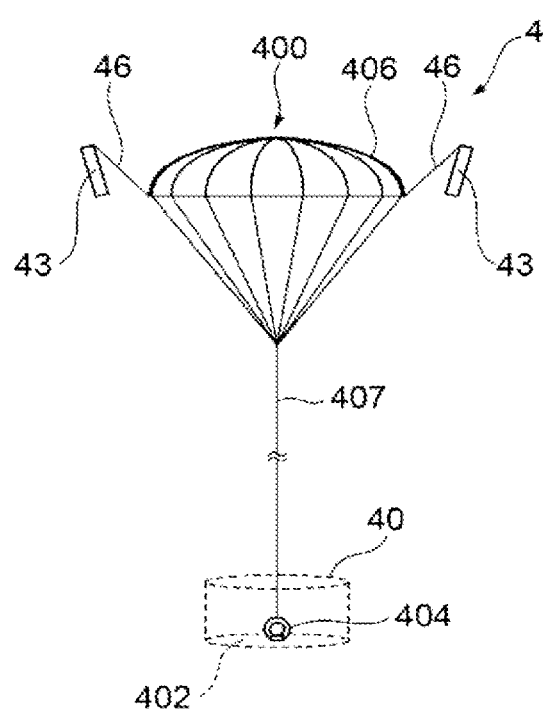
FIG. 4 is a diagram schematically illustrating a state with a parachute being open.

FIG. 4 is a diagram schematically illustrating a state with the parachute 400 being open.

As illustrated in the figure, the parachute 400 includes a parachute body (canopy) 406, and a hanging line 407 connecting the parachute body 406 and the parachute accommodation section 40 (a parachute attachment section 404).

The parachute body 406 is connected to the flying bodies 43 by the connection lines 46. For example, as illustrated in FIG. 4, the connection line 46 is connected to the parachute body 406 at an edge (peripheral edge) side from an apex of the parachute body 406. More specifically, the respective connection lines 46 are connected to a peripheral edge portion of the parachute 400 in a separated manner from one another. For example, as illustrated in FIG. 4, when the shape of the parachute 400 in a view from the apex side when the parachute 400 opens is circular, each connection line 46 is connected along the circumferential direction of the peripheral edge portion of the parachute 400 at equal intervals.

Note that when only one flying body 43 is provided, the connection line 46 may be connected to the peripheral edge portion of the parachute 400. In this case, positions at the peripheral edge portion of the parachute 400 connected with the connection lines 46 are not particularly limited.

The connection line 46 is formed of, for example, a metal material (for example, stainless steel) or a fiber material (for example, a nylon string).

For example, a diameter D of the parachute body 406 required to cause the flight device 1 to fall at a low speed can be calculated based on the following Equation (1). In Equation (1), m is a total weight of the flight device 1, v is a falling speed of the flight device 1, ρ is an air density, and Cd is a resistance coefficient.

[Equation 1]

$$D = \frac{2}{v}\sqrt{\frac{2mg}{\rho \pi \cdot Cd}} \quad (1)$$

For example, when the total weight of the flight device 1 is m=250 (kg), the resistance coefficient is Cd=0.9, and the air density ρ=1.3 kg/m, a diameter D of the parachute body 406 required to make the falling speed v of the flight device 1 be 5 (m/s) is calculated to be 14.6 (m) from Equation (1).

For example, as illustrated in FIG. 3, the parachute 400 is accommodated in the parachute accommodation section 40 with the parachute body 406 folded before its use.

The parachute accommodation section 40 is a container configured to accommodate the parachute 400. The parachute accommodation section 40 is configured of, for example, resin. As illustrated in FIG. 1, the parachute accommodation section 40 is set on an upper surface of the aircraft body unit 2, that is, on a surface at an opposite side to the ground during flying of the flight device 1. For example, the parachute accommodation section 40 is preferably installed such that the central axis O of the aircraft body unit 2 and a central axis P of the parachute accommodation section 40 overlap with each other on the upper surface of the aircraft body unit.

As illustrated in FIG. 3, the parachute accommodation section 40 has, for example, a cylindrical shape having an opening at one end and having a bottom at the other end.

Specifically, the parachute accommodation section 40 includes a side wall portion 401 having a tube shape (for example, a cylindrical shape) and a bottom portion 402 formed so as to close an opening at one end side of the side wall portion 401.

The side wall portion 401 and the bottom portion 402 define an accommodation space 403 for accommodating the parachute 400. Note that the side wall portion 401 and the bottom portion 402 may be individually formed and then joined, or may be integrally formed.

As illustrated in FIG. 4, the bottom portion 402 is provided with the parachute attachment section 404 for connecting the parachute accommodation section 40 and the parachute 400. For example, by connecting one end of the hanging line 407 of the parachute 400 to the parachute attachment section 404, the parachute 400 and the parachute accommodation section 40 are connected.

Note that the parachute accommodation section 40 may be provided with a lid covering the opened one end side of the side wall portion 401 in a state with the parachute 400 accommodated in the accommodation space 403.

The flying body 43 is a device configured to discharge the parachute 400 to the outside of the parachute accommodation section 40 to assist the opening (deployment) of the parachute 400. The flying body 43 obtains a thrust force, for example, by spraying gas. The flying body 43 is connected to the parachute 400 through the connection line 46 as described above.

The parachute device 4 includes at least one flying body 43. For example, the parachute device 4 preferably includes three or more flying bodies 43. In the present embodiment, as an example, a case of the parachute device 4 including three flying bodies will be exemplified and described. Note that a specific configuration of the flying body 43 will be described below.

The ejection section 41 is a device configured to hold the flying body 43 to eject the held flying body 43. The ejection section 41 is provided for each flying body 43. The parachute device 4 according to the present embodiment includes three ejection sections 41 for separately accommodating three flying bodies 43.

Figure 5:
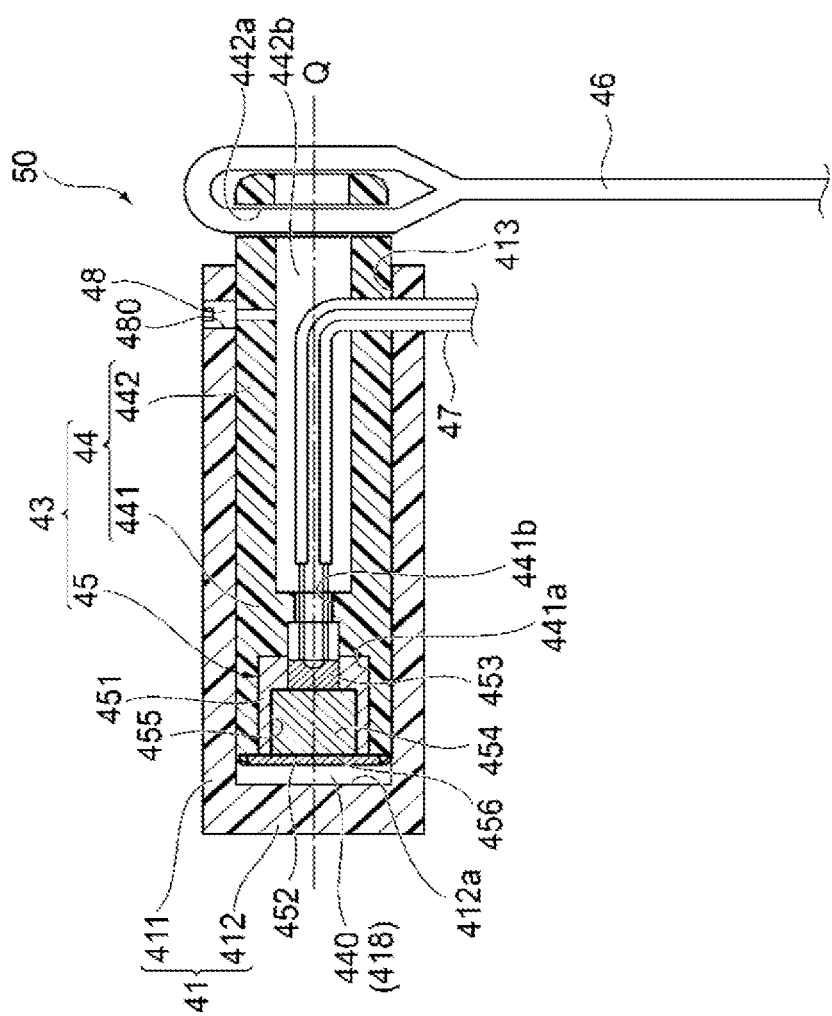
FIG. 5 is a diagram illustrating a configuration of a flying body ejection mechanism according to Embodiment 1.

FIG. 5 is a diagram illustrating a configuration of a flying body ejection mechanism according to Embodiment 1.

In the same diagram, a cross-sectional shape of the flying body ejection mechanism 50 including the flying body 43 and the ejection section 41 is illustrated.

As illustrated in FIG. 5, the ejection section 41 is formed in a tube shape (for example, a cylindrical shape) having an opening at one end and having a bottom at the other end. Specifically, the ejection section 41 includes, for example, a side wall portion 411 having a cylindrical shape and a bottom portion 412 covering one end of the side wall portion 411. The side wall portion 411 and the bottom portion 412 define an accommodation space for accommodating the flying body 43. The side wall portion 411 and the bottom portion 412 are formed of, for example, resin.

Each ejection section 41 is provided in the parachute accommodation section 40. Specifically, as illustrated in FIG. 1 and the like, each ejection section 41 is joined to an outer peripheral surface of the parachute accommodation section 40 such that an ejection port 413 being an opening portion formed at an end portion at an opposite side to the bottom portion 412 in the side wall portion 411 faces the opened one end side of the parachute accommodation section 40.

Further, each of the ejection sections 41 is disposed at equal intervals in a rotational direction with the central axis P of the parachute accommodation section 40 as a center. For example, when there are three of the flying bodies 43 and 3 of the ejection sections 41 as in the present embodiment, the respective ejection sections 41 are arranged at 120° (=360°/3) intervals in the rotational direction with the central axis P of the parachute accommodation section 40 as a center.

Note that when only one ejection section 41 is provided, it is sufficient that the ejection section 41 be joined to the outer peripheral surface of the parachute accommodation section 40. In this case, a position on the outer peripheral surface of the parachute accommodation section 40 joined with the ejection section 41 is not particularly limited.

The flying body 43 includes a gas generating device 45 and a flying body main body section 44. As illustrated in FIG. 5, the flying body 43 is disposed such that the flying body main body section 44 is inserted in an interior of the ejection section 41 at one end side, and the gas generating device 45 faces the bottom portion 412 (a bottom surface 412a) of the ejection section 41 in the interior of the ejection section 41.

The gas generating device 45 is a device configured to generate gas serving as a base of a thrust force for ejecting the flying body 43 to the outside from the ejection port 413 of the ejection section 41. As illustrated in FIG. 5, for example, the gas generating device 45 includes a housing 451, a sealing member 452, an ignition agent 453, a gas generating agent 454, and an ignition section (not illustrated).

The ignition section is electrically connected to the ejection control section 42 to be described later through a lead wire (conductive wire) 47. The ignition section ignites the ignition agent 453 in response to an ignition signal output from the ejection control section 42, and causes the gas generating agent 454 to chemically react to generate gas.

The housing 451 is a housing including a gas discharge chamber 455 configured to house the ignition agent 453 and the gas generating agent 454 and to discharge the gas generated from the gas generating agent 454. For example, the housing 451 has a dome shape. The housing 451 is configured of, for example, resin. Preferably, the housing 451 is configured of fiber-reinforced plastics (FRP) or the like. Note that the housing 451 is not limited to being made of resin, and may be configured of metal.

As illustrated in FIG. 5, the gas discharge chamber 455 is filled with the gas generating agent 454. A gas discharge hole 456 for discharging gas generated from the gas generating agent 454 is formed in the gas discharge chamber 455. In addition, the gas discharge chamber 455 is provided with the sealing member 452 covering the gas discharge hole 456 to seal the gas generating agent 454 in the gas discharge chamber 455. When gas is generated from the gas generating agent 454, the sealing member 452 is configured of a material to be easily destroyed by a pressure of the generated gas. The sealing member 452 is, for example, a thin film such as polyester.

The gas generating device 45 is disposed in an internal space 440 defined by the ejection section 41 and the flying body main body section 44.

The flying body main body section 44 is a component configured to hold the gas generating device 45 and connected to the connection line 46. The flying body main body section 44 is formed, for example, in a bar shape. More specifically, the flying body main body section 44 is formed in a partially hollow cylindrical shape, for example. The flying body main body section 44 is engaged with the ejection section 41.

The flying body main body section 44 has the gas generating device 45 at one end, and is connected to the connection line 46 at the other end. In other words, the flying body main body section 44 is separated into two functional sections of a holding section 441 configured to hold the gas generating device 45 in the axis Q direction of the flying body main body section 44, and a connection section 442 for connecting with the connection line 46.

The flying body main body section 44 is configured of, for example, resin. The holding section 441 and the connection section 442 may be integrally formed, for example, as a resin molded article, or may be formed as separated components and then joined to each other. In the present embodiment, the flying body main body section 44 will be described as a component integrally molded with the holding section 441 and the connection section 442.

The holding section 441 houses and holds the gas generating device 45 in the interior. Specifically, the holding section 441 holds the gas generating device 45 in the interior of the ejection section 41 such that the gas discharge side of the gas generating device 45, that is, the gas discharge hole 456 (sealing member 452) side of the housing 451, faces the bottom portion 412 (bottom surface 412a) of the ejection section 41. For example, the holding section 441 includes a hole 441a formed so as to correspond to the shape of the gas generating device 45. For example, by press-fitting or adhering the gas generating device 45 to the hole 441a, the holding section 441 holds the gas generating device 45.

The connection section 442 is formed so as to protrude to a side opposite to the holding section 441 in a direction parallel to the axis Q of the flying body main body section 44. The connection section 442 is formed in a tube shape (for example, a cylindrical shape). The connection section 442 includes a locking section 442a for locking the connection line 46 at an end portion at an opposite side to the holding section 441. The locking section 442a is, for example, a through hole. For example, the connection line 46 is locked to the locking section 442a while being inserted through the through hole as the locking section 442a.

At least a part of the lead wire 47 extends in an interior of the connection section 442 having a tube shape. The lead wire 47 is configured of, for example, a vinyl wire, a tin-plated wire, an enamel wire, or the like. For example, the lead wire 47 is routed in the internal space 442b of the connection section 442, and is connected to the gas generating device 45 held by the holding section 441 through a through hole 441b formed at the bottom surface of the holding section 441 of the flying body main body section 44.

In order to prevent the flying body 43 from falling out of the ejection section 41 when the parachute device 4 is not in use, as illustrated in FIG. 5, the flying body 43 may be secured to the ejection section 41 by using a pin (shear pin) 48. For example, as illustrated in FIG. 5, a through hole 480 is formed at the side wall portion 411 of the ejection section 41, and a hole (for example, a non-through hole) is formed at the flying body main body section 44 of the flying body 43. Then, with the through hole 480 at the side wall portion 411 side and the hole at the flying body main body section 44 side overlapped with each other, the pin 48 is inserted into the through hole 480 at the side wall portion 411 side and the hole at the flying body main body section 44 side. Due to this, the flying body 43 is secured to the ejection section 41 when the parachute device 4 is not in use.

The pin 48 is configured to be destructive by a force applied to the pin 48 in the axis Q direction of the flying body main body section 44 when the flying body 43 is ejected. This may not disturb the ejection of the flying body 43 due to the pin 48. For example, aluminum alloys, resin, and the like may be preferably used for the pin 48.

As illustrated in FIG. 5, the flying body 43 is disposed in the interior of the ejection section 41 with the gas generating device 45 (sealing member 452) spaced apart from and facing the bottom portion 412 (bottom surface 412a) of the ejection section 41. This forms a space 418 between the gas generating device 45 of the flying body 43 and the bottom portion 412 of the ejection section 41.

It should be noted that a distance between the gas generating device 45 of the flying body 43 and the bottom portion 412 of the ejection section 41 can be changed as appropriate so that a pressure of gas for ejecting the flying body 43 is appropriate.

The ejection control section 42 is a functional section configured to perform control for ejecting the flying body 43 from the ejection section 41. The ejection control section 42 outputs an ignition signal when a control signal indicating the opening of the parachute 400 is output from the fall control section 16, for example. The ignition signal is input to an ignition section (not illustrated) of the gas generating device 45 provided in each flying body 43 through the lead wire 47, and the ignition section ignites the ignition agent 453 in response to the input ignition signal.

Next, a procedure of the opening of the parachute 400 in the parachute device 4 according to Embodiment 1 will now be described.

For example, during flying of the flight device 1 equipped with the parachute device 4, when a state with the inclination of the aircraft body (the aircraft body unit 2) of the flight device 1 exceeds the inclination threshold value 29 for a predetermined period of time because of strong wind, and the abnormality detection section 15, 15A determines that it is in the abnormal state, the fall control section 16 at the flight device 1 side or the fall control section 16A at the parachute device 4 side transmits a control signal indicating the opening of the parachute 400 to the ejection control section 42 of the parachute device 4.

The ejection control section 42 of the parachute device 4 outputs an ignition signal when the control signal indicating the opening of the parachute 400 is received. The ignition signal is transmitted to the ignition section (not illustrated) of the gas generating device 45 through the lead wire 47.

In response to the received ignition signal, the ignition section of the gas generating device 45 ignites the ignition agent 453 and causes the gas generating agent 454 to chemically react, and gas is generated in the gas discharge chamber 455. As the pressure of the gas generated in the gas discharge chamber 455 increases, the sealing member 452 covering the gas discharge hole 456 is broken. This causes the gas in the gas discharge chamber 455 to be discharged from the gas discharge hole 456 into the space 418 in the ejection section 41, and the space 418 is filled with the gas. Then, when the pressure of the gas in the space 418 exceeds a predetermined value, the flying body 43 is moved toward the ejection port 413 side due to the pressure of the gas, and is ejected from the ejection port 413 of the ejection section 41.

When the flying body 43 is ejected from each ejection section 41, each flying body 43 pulls the parachute 400 through the connection line 46. This causes the parachute 400 to be discharged from the parachute accommodation section 40. After that, for the parachute 400 further pulled by each flying body 43, the parachute body 406 is expanded by the air entering in the interior of the parachute body 406 in the folded state. This causes the parachute 400 to open.

Figure 6:
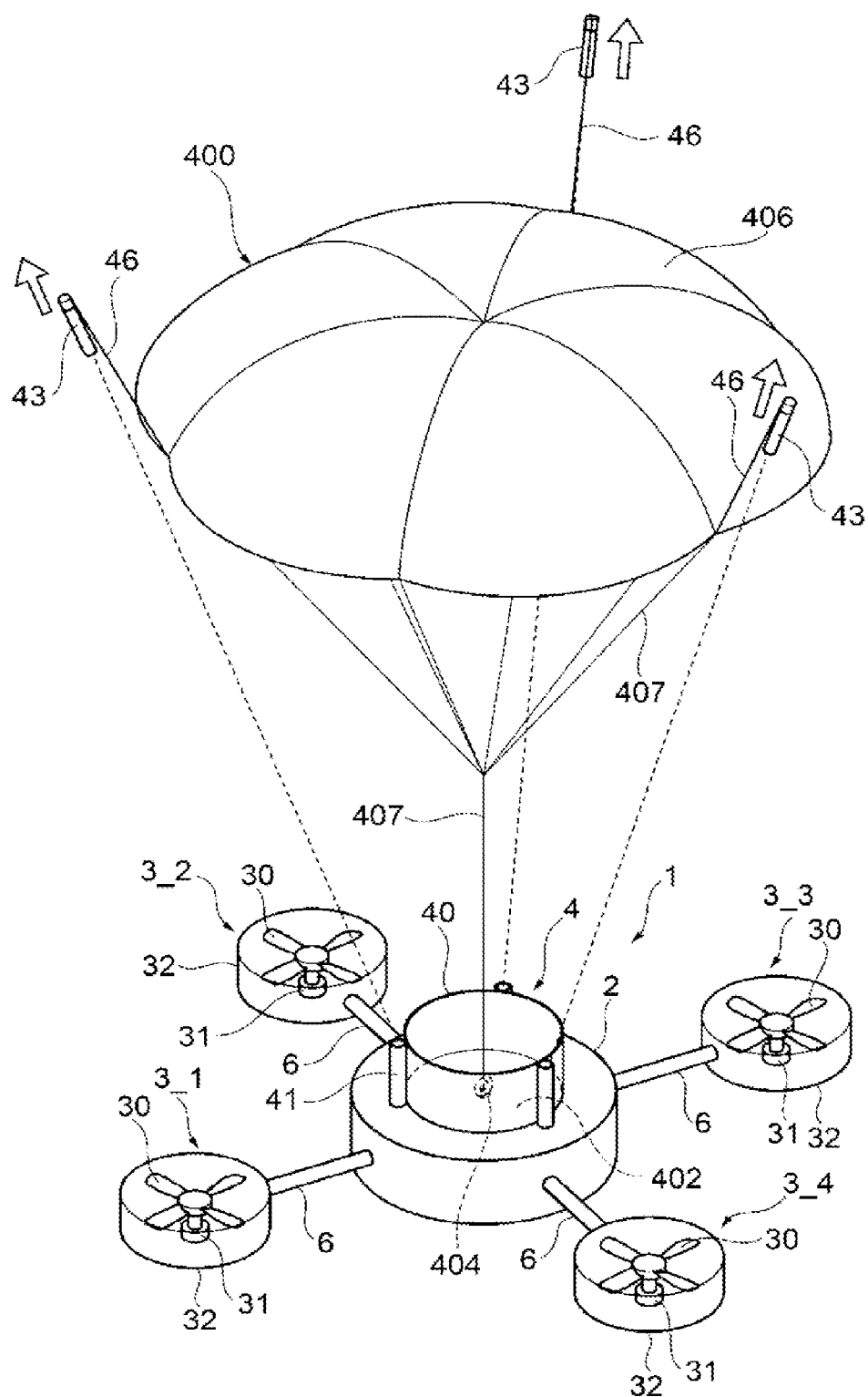
FIG. 6 is a diagram schematically illustrating a state with the parachute of the flight device equipped with the parachute device according to Embodiment 1 being open.

FIG. 6 is a diagram schematically illustrating a state with the parachute 400 of the flight device 1 according to Embodiment 1 being opened.

For example, when each flying body 43 is ejected through the processing procedure described above, each flying body 43 pulls the parachute body 406 of the discharged parachute 400 from its apex portion toward the edge (peripheral edge) side. This allows the parachute body 406 to be expanded and easily filled with the air, and thus, allows the parachute 400 to be immediately opened.

As described above, the parachute device 4 according to Embodiment 1 includes at least one flying body 43 connected to the parachute 400, and the flying body 43 includes the flying body main body section 44 engaged with the ejection section 41, and the gas generating device 45 disposed in the internal space 440 defined by the ejection section 41 and the flying body main body section 44.

Thus, as described above, since gas is generated from the gas generating device 45 to increase the pressure of the gas in the internal space 440 defined by the ejection section 41 and the flying body main body section 44, the flying body 43 can be made to fly from the ejection section 41. The flight of the flying body 43 allows the parachute body 406 of the parachute 400 connected to the flying body 43 to be pulled from its apex portion to the edge (peripheral edge) side, allowing the parachute body 406 to be more easily filled with the air and allowing the parachute 400 to be immediately opened.

Thus, even when a rotary wing aircraft, like the flight device 1, being capable of maintaining a stationary state in the sky cannot obtain the airflow effect during falling, the parachute can be quickly and reliably opened by attaching the parachute device 4 according to the present embodiment.

In addition, in the parachute device 4, the flying body 43 itself is provided with the gas generating device 45 as a thrust force generation device. This makes it possible to suppress an increase in the weight of the parachute device 4 as it is not necessary to provide the thrust force generation device in the parachute device 4 separately from the flying body 43, and makes it possible to reduce the cost.

Also, when a plurality of flying bodies 43 are provided in the parachute device 4, since each flying body 43 includes the gas generating device 45, it is easy to control the ejection timing for each flying body 43. For example, in an ejection manner where a single gas generating device is provided as the thrust force generation device in the parachute device 4 and the gas generated from the gas generating device is discharged to the flying bodies, all of the flying bodies can only be simultaneously ejected. In contrast, according to the parachute device 4 according to the present embodiment, it is easy to change the timing of ejecting the plurality of flying bodies 43.

Thus, according to the flying body 43 according to the present embodiment, the degree of freedom of control of the parachute device 4 can be increased.

In addition, in the parachute device 4 according to Embodiment 1, the flying body 43 is disposed in a state with the flying body main body section 44 holding the gas generating device 45 inserted in the interior of the ejection section 41 at one end, and with the gas generating device 45 facing the bottom portion 412 of the ejection section 41 in the interior of the ejection section 41.

According to this, the gas generating device 45 is housed in the interior of the ejection section 41, and thus, it is possible to prevent degradation or the like of the gas generating device 45 due to rainwater or foreign matter being exposed to the gas generating device 45. In addition, since the flying body 43 is accommodated in the ejection section 41, when the gas generating device 45 is ignited, gas generated from the gas generating device 45 is stored in the ejection section 41 to increase a gas pressure, the flying body 43 can be vigorously ejected.

Also, the inner peripheral surface of the ejection section 41 formed in a tube shape functions as a guide mechanism configured to guide movement of the flying body 43 at the time of ejection, allowing the flying body 43 to more linearly fly.

Also in the parachute device 4, the flying body main body section 44 includes the holding section 441 configured to hold the gas generating device 45, and the connection section 442 connected to the connection line 46 and formed so as to protrude to a side opposite to the holding section 441 in the axis Q direction of the flying body main body section 44.

This can easily achieve connection of the flying body 43 and the parachute 400 by using the connection line 46 while stably holding the flying body 43 by the ejection section 41.

In addition, in the parachute device 4, the connection section 442 is formed in a tube shape, and at least a part of the lead wire 47 for igniting the gas generating device 45 is routed in the interior of the connection section 442.

This facilitates the routing of the lead wire 47 extending from the gas generating device 45 held by the holding section 441 in the interior of the flying body main body section 44.

In addition, in the parachute device 4, the weight of the parachute device 4 can be reduced by configuring the parachute accommodation section 40, the ejection section 41, the flying body main body section 44, and the like by using resin (for example, synthetic resin).

Embodiment 2

Figure 7:
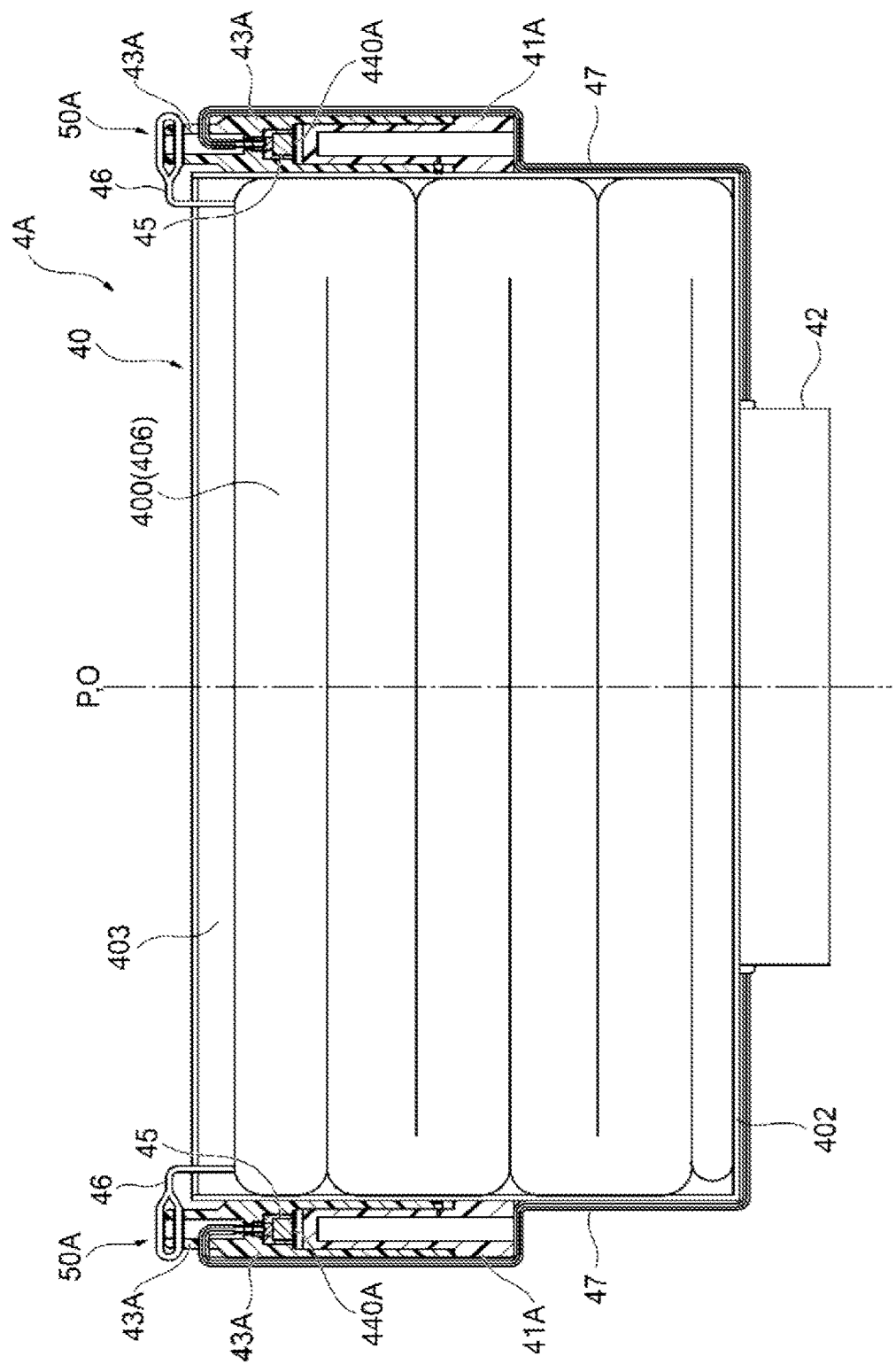
FIG. 7 is a diagram schematically illustrating a configuration of a parachute device according to Embodiment 2.

FIG. 7 is a diagram schematically illustrating a configuration of a parachute device 4A according to Embodiment 2. A side cross section of the parachute device 4A is illustrated in the same figure.

The parachute device 4A according to Embodiment 2 differs from the parachute device 4 according to Embodiment 1 in the structures of the flying body and the ejection section, and is similar to the parachute device 4 according to Embodiment 1 in other respects.

Figure 8:
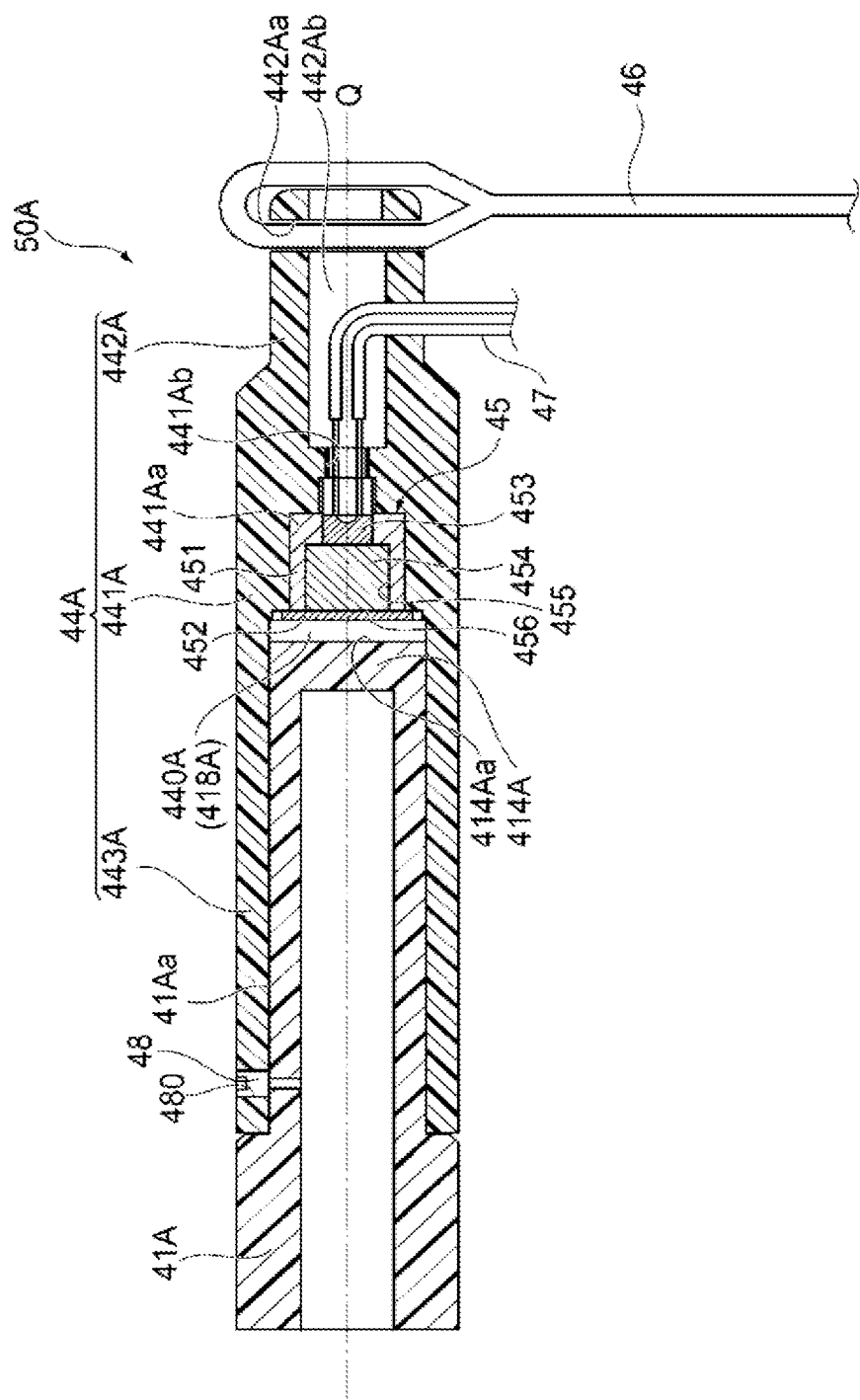
FIG. 8 is a diagram illustrating a configuration of a flying body ejection mechanism according to Embodiment 2.

FIG. 8 is a diagram illustrating a configuration of a flying body ejection mechanism 50A including a flying body 43A and an ejection section 41A according to Embodiment 2.

The flying body 43A is disposed on the ejection section 41A so as to cover at least a part of an outer peripheral surface of the ejection section 41A. Specifically, as illustrated in FIG. 8, the flying body 43A is supported on the ejection section 41A with at least a part of the ejection section 41A inserted in an interior of a flying body main body section 44A and with the gas generating device 45 facing a tip end portion 414A of the ejection section 41A.

The flying body 43A includes the gas generating device 45 and the flying body main body section 44A. The gas generating device 45 is disposed in an internal space 440A defined by the ejection section 41A and the flying body main body section 44A.

The flying body main body section 44A is formed into a tube shape (for example, a cylindrical shape) having an opening at one end and having a bottom at the other end. The flying body main body section 44A is configured of resin, for example. The gas generating device 45 is provided in the interior of the flying body main body section 44A.

More specifically, the flying body main body section 44A is inserted through the ejection section 41A at the opening portion side of the tube, holds the gas generating device 45 at the bottom portion side of the tube, and is connected to the connection line 46 at an end portion at an opposite side to the opening portion with the bottom portion interposed. In other words, the flying body main body section 44A is divided into three functional sections of a supporting section 443A for supporting the flying body 43A at the ejection section 41A along the axis Q of the flying body main body section 44A, a holding section 441A for holding the gas generating device 45, and a connection section 442A for connecting with the connection line 46.

Here, the supporting section 443A, the holding section 441A, and the connection section 442A may be integrally formed, for example, as a resin molded article, or may be formed as separated components and joined to each other. In the present embodiment, the flying body main body section 44A will be described as a component integrally molded with the supporting section 443A, the holding section 441A, and the connection section 442A.

The supporting section 443A is formed in a tube shape (for example, a cylindrical shape). An inner diameter of the supporting section 443A has a size corresponding to an outer diameter of the ejection section 41A. At least a part of the ejection section 41A is inserted into the supporting section 443A from one end side. Specifically, the tip end portion 414A of the ejection section 41A is inserted into the interior of the supporting section 443A from one end side of the supporting section 443A.

The holding section 441A includes, for example, a hole 441Aa formed so as to correspond to the shape of the gas generating device 45. The holding section 441A holds the gas generating device 45 by, for example, press-fitting or adhering the gas generating device 45 to the hole 441Aa.

The holding section 441A holds the gas generating device 45 at the other end side of the supporting section 443A with the holding section 441A facing the tip end portion 414A of the ejection section 41A inserted from one end side of the supporting section 443A. That is, the gas generating device 45 is disposed such that the gas discharge side of the gas generating device 45, that is, the gas discharge hole 456 (sealing member 452) side of the housing 451 faces the tip end portion 414A of the ejection section 41A.

As illustrated in FIG. 8, the flying body 43A is disposed with the gas generating device 45 (sealing member 452) spaced apart from and facing the tip end portion 414A (tip end surface 414Aa) of the ejection section 41A. This forms a space 418A between the gas generating device 45 of the flying body 43A and the tip end portion 414A of the ejection section 41A.

Note that a distance between the gas generating device 45 of the flying body 43A and the tip end portion 414A of the ejection section 41A can be changed as appropriate so that the pressure of gas for ejecting the flying body 43A becomes appropriate.

The connection section 442A is formed so as to protrude from the holding section 441A to a side opposite to the supporting section 443A in a direction parallel to the axis Q of the flying body main body section 44A. The connection section 442A is formed, for example, in a tube shape (for example, a cylindrical shape) having an opening at one end and having a bottom at the other end.

The connection section 442A is connected to the connection line 46. Specifically, the connection section 442A has the locking section 442Aa for locking the connection line 46 at an end portion at an opposite side to the supporting section 443A. The locking section 442Aa is, for example, a through hole. For example, the connection line 46 is locked to the locking section 442Aa while being inserted through the through hole serving as the locking section 442Aa.

At least a part of the lead wire 47 extends in the interior of the connection section 442A having a tube shape. For example, the lead wire 47 is routed in the internal space 442Ab of the connection section 442A, and is connected to the gas generating device 45 held by the holding section 441A through a through hole 441Ab formed at the bottom surface of the holding section 441A of the flying body main body section 44A.

As described above, in the parachute device 4A according to Embodiment 2, the flying body 43A is supported on the ejection section 41A with at least a part of the ejection section 41A formed in a bar shape inserted in the interior of the flying body main body section 44A and with the gas generating device 45 facing the tip end portion 414A of the ejection section 41A.

According to this, the gas generating device 45 is sealed by the ejection section 41A with the gas generating device 45 accommodated in the interior of the flying body main body section 44A, it is possible for the gas generating device 45 to prevent degradation of the gas generating device 45 due to exposure to rainwater or foreign matter. In particular, because the flying body main body section 44A is disposed so as to cover (so as to put on a lid over) the ejection section 41A having a bar shape, even when the flying body 43A is exposed to rain or wind when the parachute device 4A is disposed in the flight device 1, it is difficult for rainwater or foreign matter to enter in the interior of the flying body main body section 44A.

In addition, according to the parachute device 4A according to Embodiment 2, the gas generated by the gas generating device 45 is stored in a space defined by the inner wall surface of the supporting section 443A and the tip end surface 414Aa of the ejection section 41A to increase the gas pressure, and as a result, the flying body 43A can be vigorously ejected. In addition, a side surface 41Aa of the ejection section 41A functions as a guide mechanism configured to guide movement of the flying body 43A at the time of ejection, allowing the flying body 43A to more linearly fly.

In addition, in the parachute device 4A, since the gas generating device 45 is provided at the other end side (at the holding section 441A side) of the supporting section 443A having a tube shape, the gas generated by the gas generating device 45 continues to be discharged from the one end side through the interior of the supporting section 443A even after the flying body 43A is ejected from the ejection section 41A. This allows the flying body 43A to linearly fly after the ejection of the flying body 43A.

Also, when the flying body 43A is designed to have the same outer diameter dimension as that of the flying body 43 according to Embodiment 1, a weight of the flying body 43A is larger than that of the flying body 43, so that an inertial force when the flying body 43A is ejected is larger than that of the flying body 43. As a result, the parachute 400 is more easily opened.

In addition, in the parachute device 4A, the connection section 442A of the flying body 43A is formed in a cylindrical shape, and at least a part of the lead wire 47 for igniting the gas generating device 45 is routed in the interior of the connection section 442A.

This facilitates the routing of the lead wire 47 in the interior of the flying body main body section 44A, similarly to the parachute device 4 according to Embodiment 1.

Expansion of Embodiment

The invention conceived by the present inventors has been described in detail above with reference to the embodiments. However, the present invention is not limited to the embodiments, and of course, various modifications can be made without departing from the gist of the present invention.

For example, in the embodiments described above, the examples have been given that the ejection control section 42 is provided in the parachute device 4, 4A, but the present invention is not limited to this. For example, the ejection control section 42 may be provided in the flight device 1.

Figure 9:
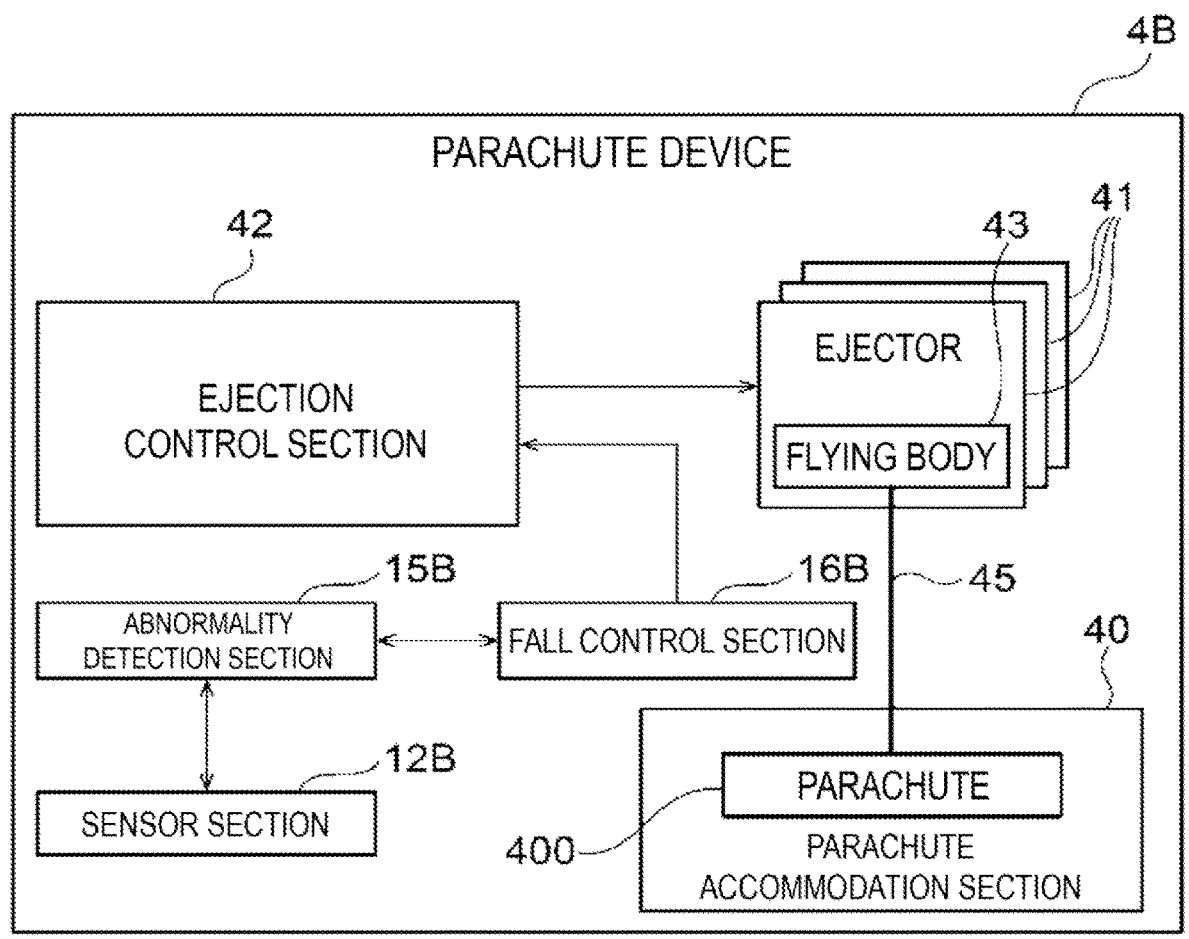
FIG. 9 is a functional block diagram of a parachute device including an abnormal state detection mechanism.

Furthermore, in the embodiments described above, the examples have been given where the parachute device 4, 4A ejects the flying body 43, 43A in response to a signal from the fall control section 16 provided at the aircraft body unit 2 side, but the present invention is not limited to this. For example, as illustrated in FIG. 9, a parachute device 4B may include an abnormal state detection mechanism including a sensor section 12B, an abnormality detection section 15B, and a fall control section 16B. The sensor section 12B, the abnormality detection section 15B, and the fall control section 16B respectively have similar functions to those of the sensor section 12, the abnormality detection section 15, and the fall control section 16. This allows the parachute device 4, 4B itself to detect an abnormal state to eject the flying body 43, 43A.

In this case, the aircraft body unit 2 may or may not have an abnormal state detection mechanism including the sensor section 12, the abnormality detection section 15, and the fall control section 16. Both of the aircraft body unit 2 and the parachute device 4B have an abnormal state detection mechanism, and thus, even when one abnormal state detection mechanism cannot detect an abnormal state due to some causes, it is possible to detect the abnormal state by the other abnormal state detection mechanism to more reliably open the parachute 400.

In the embodiments described above, a case of the parachute accommodation section 40 having a cylindrical shape has been exemplified, but the present invention is not limited to this. That is, the parachute accommodation section 40 may have a space for accommodating the parachute 400 in the interior, and may be formed, for example, in a polygonal column (for example, quadrangular prism) shape.

Furthermore, in the embodiments described above, the examples have been given where the flying body 43, 43A is disposed such that a space 418 is formed between the gas generating device 45 and the ejection section 41, 41A, but the present invention is not limited this. That is, when sufficient gas pressure can be obtained in order to eject the flying body 43, 43A, the gas generating device 45 may be disposed in contact with the ejection section 41, 41A (the bottom surface 412a, the tip end surface 414Aa).

In addition, in the embodiments described above, the examples have been given that the outer shape of the ejection section 41, 41A is cylindrical, but the present invention is not limited to this. That is, the ejection section 41 may have a structure accommodating the flying body 43 in the interior, and being capable of ejecting the flying body 43, for example, the outer shape may be a polygonal column (for example, quadrangular prism) shape, and the internal space accommodating the flying body 43 may be cylindrical. Similarly, the ejection section 41A may have a structure that the flying body 43A is disposed outside and the flying body 43A can be ejected, and for example, the outer shape may be a polygonal column (for example, quadrangular prism) shape. However, in that case, the internal shape of the flying body 43A needs to be matched to the ejection section 41A.

In addition, the parachute device 4, 4A may be provided with a mechanism for preventing incorrect ejection of the flying body 43, 43A. For example, a safety pin is provided in the parachute device 4, 4A, and when the safety pin is inserted, the parachute device 4, 4A may not operate, and when the safety pin is detached, the parachute device 4, 4A may become operable.

Additionally, in the flight device 1 according to the embodiments described above, examples have been given where the flight control section 14 and the like serving as functional sections for controlling flying in a normal state, and the abnormality detection section 15, the fall control section 16, and the storage section 18 serving as functional sections for performing fall control at the time of occurrence of an abnormality, are operated by power supply from the same battery 22, but the present invention is not limited this.

For example, a battery for a functional section for controlling flying in a normal state and a battery for a functional section for performing fall control at the time of occurrence of an abnormality may be separately prepared. According to this, even when an abnormality occurs in the battery for the functional section for controlling flying in the normal state and power cannot be supplied, the fall control processing can be performed.

Furthermore, the functional section for performing fall control at the time of occurrence of an abnormality may be configured such that the power supply from the two batteries described above can be selected. This enables the fall control processing to be reliably performed because even when an abnormality occurs in one battery, power can be supplied from the other battery.

In addition, in the embodiments described above, a shock absorbing member such as an airbag may be provided at the lower surface of the aircraft body unit 2. In this way, the safety of the flight device 1 during falling can be further improved.

REFERENCE SIGNS LIST

1 Flight device
2 Aircraft body unit
3, 3_1 to 3_n Thrust force generation section
4, 4A, 4B Parachute device
5 Notification device
6 Arm section
9 External device
11 Power supply section
12, 12B Sensor section
13, 13_1 to 13_n Motor drive section
14 Flight control section
15, 15B Abnormality detection section
16, 16B Fall control section
17 Communication section
18 Storage section
22 Battery
23 Power supply circuit
24 Angular velocity sensor
25 Acceleration sensor
26 Magnetic sensor
27 Angle calculation section
28 Remaining capacity threshold value
29 Inclination threshold value
30 Propeller
31 Motor
32 Case
40 Parachute accommodation section
41, 41A Ejection section
41Aa Side surface
42 Ejection control section
43, 43A Flying body
44, 44A Flying body main body section
45 Gas generating device
46 Connection line
47 Lead wire
50, 50A Flying body ejection mechanism
400 Parachute
401 Side wall portion
402 Bottom portion
403 Accommodation space
404 Parachute Attachment section
406 Parachute body (canopy)
407 Hanging line
411 Side wall portion
412 Bottom portion
412a Bottom surface
413 Ejection port
414A Tip end portion
414Aa Tip end surface
418, 418A Space
440, 440A Internal space
441, 441A Holding section
441a Hole
441b, 441Ab Through hole
442, 442A Connection section
442a, 442Aa Locking section
442b, 442Ab Internal space
443A Supporting section
451 Housing
452 Sealing member
453 Ignition agent
454 Gas generating agent
455 Gas discharge chamber
456 Gas discharge hole

The invention claimed is:

1. A parachute device comprising:
a parachute;
a parachute accommodation section configured to accommodate the parachute;
at least one flying body connected to the parachute;
an ejection section formed in a tube shape having an opening at one end and having a bottom at an other end, and configured to hold the flying body and to eject the flying body held; and
a connection line connecting the parachute and the flying body, wherein
the flying body includes
a flying body main body section formed in a bar shape and engaged with the ejection section, and
a gas generating device disposed at one end side of the flying body main body section and disposed in an internal space defined by the ejection section and the flying body main body section, and configured to generate gas, and
the flying body is disposed such that the flying body main body section is inserted in an interior of the ejection section at the one end side, and the gas generating device faces a bottom portion of the ejection section in the interior of the ejection section, wherein
the flying body main body section includes
a holding section configured to hold the gas generating device, and
a connection section formed so as to protrude to a side opposite to the holding section in an axis direction of the flying body main body section, and connected to the connection line.

2. The parachute device according to claim 1, further comprising:
a lead wire configured to ignite the gas generating device, wherein the connection section is formed in a tube shape, and
at least a part of the lead wire is routed in an interior of the connection section.

3. The parachute device according to claim 1, further comprising:
an abnormality detection section configured to detect an abnormality during flying; and
a parachute control section configured to cause the flying body to be ejected from the ejection section in response to detection of the abnormality by the abnormality detection section.

4. A parachute device comprising:
a parachute;
a parachute accommodation section configured to accommodate the parachute;
at least one flying body connected to the parachute; and
an ejection section configured to hold the flying body and to eject the flying body held, and formed in a bar shape, wherein
the flying body includes
a flying body main body section engaged with the ejection section, and formed in a tube shape having an opening at one end and having a bottom at an other end, and
a gas generating device disposed in an internal space defined by the ejection section and the flying body main body section, configured to generate gas, and provided in an interior of the flying body main body section, and
the flying body is supported on the ejection section such that at least a part of the ejection section is inserted in an interior of the flying body main body section, and the gas generating device faces a tip end portion of the ejection section.

5. The parachute device according to claim 4, further comprising:
a connection line connecting the parachute and the flying body, wherein the flying body main body section includes
a supporting section formed in a tube shape, and inserted with at least a part of the ejection section from one end side,
a holding section configured to hold the gas generating device at an other end side of the supporting section such that the gas generating device faces a tip end portion of the ejection section inserted from the one end side of the supporting section, and
a connection section formed so as to protrude from the holding section to a side opposite to the supporting section, and connected to the connection line.

6. The parachute device according to claim 5, further comprising:
a lead wire configured to ignite the gas generating device, wherein the connection section is formed in a tube shape, and
at least a part of the lead wire is routed in an interior of the connection section.

7. A flight device comprising:
an aircraft body unit;
a thrust force generation section connected to the aircraft body unit and configured to generate a thrust force;
a flight control section configured to control the thrust force generation section;
an abnormality detection section configured to detect an abnormality during flying;
the parachute device according to claim 1; and
a parachute control section configured to cause the flying body to be ejected from the ejection section in response to detection of the abnormality by the abnormality detection section.

8. A flying body ejection mechanism comprising:
a flying body capable of being connected to a parachute; and
an ejection section configured to hold the flying body and to eject the flying body held, and formed in a bar shape, wherein
the flying body includes
a flying body main body section engaged with the ejection section, and formed in a tube shape having an opening at one end and having a bottom at an other end, and
a gas generating device disposed in an internal space defined by the ejection section and the flying body main body section, configured to generate gas, and provided in an interior of the flying body main body section, and
the flying body is supported on the ejection section such that at least a part of the ejection section is inserted in an interior of the flying body main body section, and the gas generating device faces a tip end portion of the ejection section.

* * * * *